Feb. 13, 1962 L. E. BODKIN 3,020,873
BRAKE WITH WEAR DETECTING MEANS
Filed Jan. 22, 1959
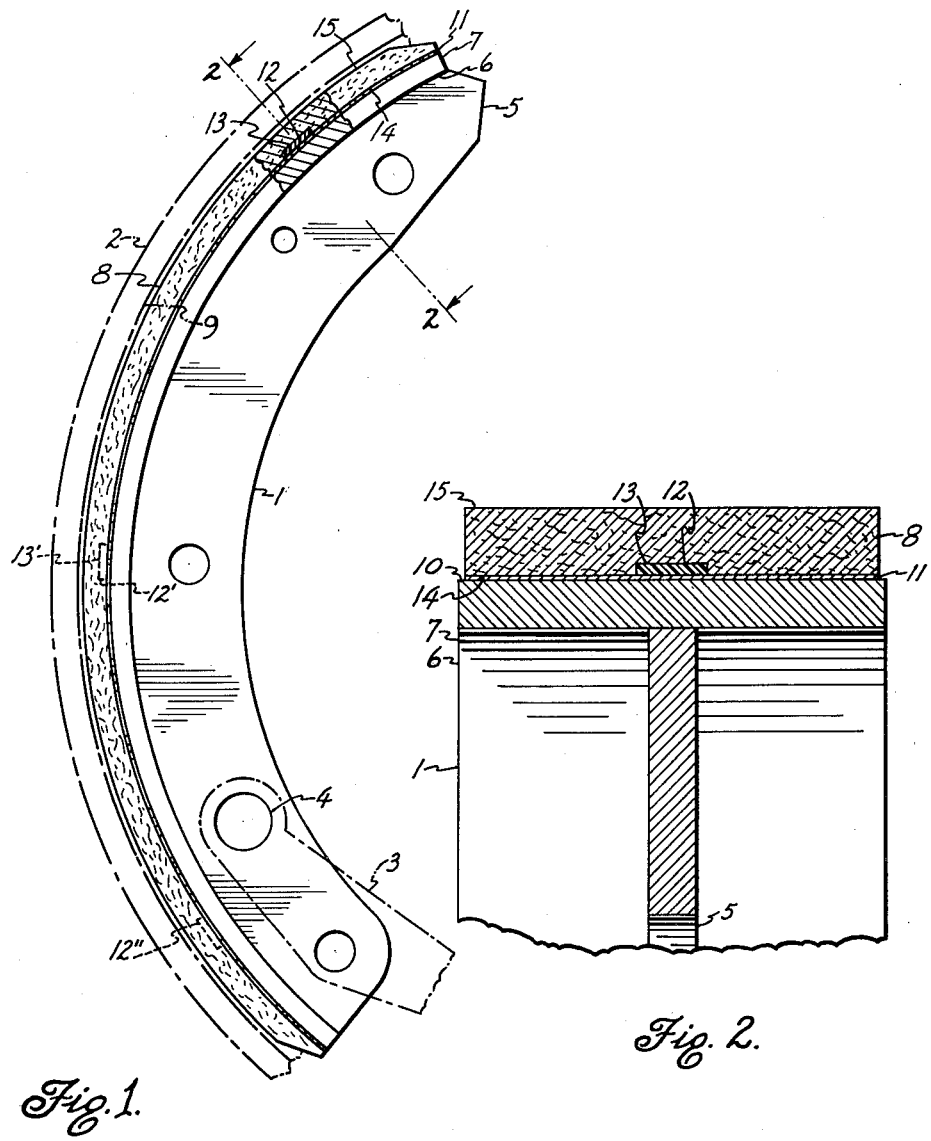
Fig. 1.
Fig. 2.
Fig. 3.
INVENTOR.
LAWRENCE E. BODKIN
BY
George H. Baldwin
ATTORNEY

United States Patent Office 3,020,873
Patented Feb. 13, 1962

3,020,873
BRAKE WITH WEAR DETECTING MEANS
Lawrence E. Bodkin, 1833 Ryar Road, Jacksonville, Fla.
Filed Jan. 22, 1959, Ser. No. 788,286
6 Claims. (Cl. 116—114)

This invention relates to brakes and more particularly to means for detecting the wear of frictional materials employed in brakes of vehicles such as automobiles, trucks, trailers and the like.

Brakes, whether of the common internal expansion variety, of the band variety, or of the disc type, are subject to wear and thereby needful of replacement of the brake linings from time to time to avoid permanent damage to the individual parts of the brake mechanism and to maintain the vehicle in a safe operating condition. The determination of the need for replacement of the brake linings may be accomplished by visual inspection which, in most cases, requires the removal of a wheel and a brake drum of the vehicle and, with certain types of brakes, requires the partial disassembly of the brake mechanism so that the linings may be viewed. If the brakes are not so inspected, the first signs of wear may be the failure of the brakes. Means for ascertaining the wear of the brake linings which reduce the necessity for visual inspection and reduce the chance of failure from excess lining wear are known, but such means tend to be complicated in structure and method of operation and may require the employment of components extrinsic to the brake mechanism itself. Such arrangements tend to be somewhat less than certain in operation, may be costly to manufacture and install, may not give sufficient warning, or may interfere with, or actually cause failure of the brake.

It is desirable that brake wear detecting means be an integral part of the braking mechanism and that the means provided sense the wear of the frictional contacting material at a point in time of use which is prior to actual diminution of the braking power of the braking mechanism, and further that the means operate in a manner such that the braking power and operation of all parts of the braking mechanism remain unimpaired and undamaged during operation of the detecting and signalling means.

It is a general object of the invention to provide an improved brake embodying means to detect excess wear of the friction material employed therein.

A particular object of the invention is to overcome the above outlined disadvantages of prior brake lining wear sensing arrangements and to provide an arrangement for this purpose having the above outlined desirable features.

It is another object of the invention to provide a simple and effective construction for brakes which provides means for detecting excess wear of the brake linings thereof.

A particular object of the invention is to provide a brake, the excess wear of which is detectable through the sense of smell.

A specific object of the invention is to provide a brake shoe lining element suitable for use in an internal expansion brake mechanism, which incorporates means for detecting wear of the friction lining without the aid of mechanical or electrical components extrinsic to the brake mechanism, which is inexpensive and simple and effective in construction, and the wear of which is detectable without diminution in braking power of the mechanism.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a side elevational view of a brake shoe embodying the inventive concept, certain parts being broken away to promote clarity.

FIG. 2 is a fragmentary enlarged sectional view taken generally along the line 2—2 of FIG. 1.

FIG. 3 is an enlarged perspective view of a disc-like pellet or button which, in accord with the embodiment herein illustrated and described, is incorporated in the brake lining for detection of excessive wear thereof.

With reference to FIG. 1, there is shown a brake shoe 1 which forms a component of an internal expansion brake mechanism such as commonly found in motor vehicles. The shoe 1 is associated with an adjacent brake drum, shown in broken lines at 2, and, as is evident to those skilled in the art, the braking action is accomplished through frictional contact between the brake shoe 1 and the brake drum 2. Anchoring link 3, which forms a part of a shoe suspension system by means of which the shoe is disposed adjacent to the drum and through which the shoe is actuated into frictional engagement with the drum, is shown in broken lines in FIG. 1 as being pivotally attached as at 4 to the brake shoe. It is deemed evident to those skilled in the art that the drum in such internal expansion brake mechanisms is cylindrical in shape and rotatable about its axis, the brake shoes being usually employed in pairs within the drum and simultaneously actuated to move outwardly and thus frictionally to engage the rotating drum.

The brake shoe 1 illustrated in FIGS. 1 and 2 is made up of a radially extending arcuate web 5 along the outer peripheral side edge 6 of which is rigidly secured an arcuate flange 7, and further includes a wearable brake lining 8 which is suitably secured to the flange 7. The flange 7 and the web 5 constitute a base member which serves as a means upon which the wearable brake lining 8 is rigidly mounted and a means upon which the lining is disposed in juxtaposition to the inner frictional braking surface 9 of the brake drum 2 for frictional engagement therewith upon the actuation of the brake mechanism. The lining or pad 8 is composed of a suitable heat resistant material which has a high coefficient of friction such as asbestos fibers which are suitably held together by a resinous bonding agent and, in accord with common practice, the pad is attached to the flange 7 along its outer face 10 by means of a suitable layer of adhesive or bonding agent such as indicated at 11 in FIG. 2.

In accord with the invention, the wear of the brake lining is ascertained by the detection of a distinctive odor which is produced when the lining has become worn dangerously thin. The odor is produced by the generation of heat which causes decomposition of a heat sensitive odor producing compound which has been incorporated in the inner reaches of the lining during its manufacture. A suitable compound which will produce such a distinctive odor upon being heated by friction and which has an odor which is readily detectable from the exterior of the vehicle is polystyrene. Cutaneous material such as horn is also suitable.

The heat sensitive odor producing compound, or material incorporating such compound, in the embodiment herein shown, is incorporated in the lining in the form of one or more discs which are sealed in cavities in the brake lining in the regions thereof which are last to wear. Thus, polystyrene discs, such as 12, 12' and 12", are respectively disposed in inner cavities or recesses such as recesses 13, 13' and 13" of the lining 8. The recesses are located immediately adjacent the back or inner face 14 of the lining and, accordingly, adjacent to the outer face 10 of the flange and, as shown, the recesses may open through the inner face 14. The discs 12, 12' are hermetically sealed in the lining 8 by means of the bonding agent 11 which in this embodiment secures the lining 8 firmly to and against the face 10 of the flange 7, whereby the recess is closed by the flange 7.

The incorporation in the lining of the polystyrene material in the form of buttons 12, 12', as shown, is easily accomplished during the manufacture of the conventional brake shoe such as the shoe 1 of FIGS. 1 and 2. The lining 8 is formed with one or more shallow recesses along or indentations into its inner face 14 as shown at 13 and 13'. The discs 12, 12' and 12" are then fittingly engaged in the respective recesses 13, 13' and 13" prior to the adherence of the lining 8 to the outer face 10 of the flange 7, and then the lining is bonded to the flange 7 so as to form an airtight seal about the discs which prevents exposure of the discs of heat sensitive, odor producing material to the atmosphere prior to the wearing through of the lining. The bonding agent 11 which is disposed between the flange and the lining and which rigidly joints the lining pad to the flange 7 serves this purpose and closes the recesses against face 10.

The brake shoe 1 is employed in the conventional manner and as the lining 8 becomes worn progressively thinner through frictional contact with the inner face 9 of the drum, and, when the lining is reduced in thickness to a point at which replacement is desirable, one or more of the discs 13, 13' become exposed to direct frictional contact with the drum 2 and its recess to be open to the atmosphere at the now worn outer lining surface 15. The heat generated in the disc through the frictional contact of the disc or button with the drum or merely the heating thereof by the hot lining pad during braking causes the material of which the disc is composed to degrade and to become decomposed and thereby to produce a distinctive odor which is preferably detectable by the operator of the vehicle by merely sniffing in the regions of the braked wheels. The operator, accordingly, may receive olfactory warning that the brakes should be relined in the near future to prevent the lining from wearing through and thereby impairing the braking power of the vehicle and causing damage to the drums by merely smelling the braked wheels periodically to detect the odor. The distinctive odor will reappear upon each actuation of the brake mechanism and preferably persists to remind the operator of potential faulty operation of the brakes until the situation has been remedied, and, even after one of the discs 12, 12' may have completely decomposed, a short time later further wear will expose another, and then another of the discs, and from one or another of the several lining pads of the vehicle, thereby repeating the warning several times.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of the invention.

What is claimed as new and what it is desired to secure by Letters Patent of the United States is:

1. A brake comprising a wearable friction lining, means upon which said lining is mounted for disposing said lining adjacent to a frictional braking surface, and a heat sensitive odor producing compound incorporated and hermetically sealed in said lining adjacent to said means.

2. A brake comprising a wearable brake lining, means mounting said lining for frictional contact with a frictional braking surface, said lining having a recess in its inner surface adjacent said mounting means, and said brake further comprising a material including a heat sensitive odor producing compound hermetically sealed within said recess.

3. A brake shoe comprising an arcuate base member including a radially extending arcuate web having an outer side edge and an arcuate flange rigidly secured to said web along said outer side edge, a wearable brake lining bonded to said flange having a circular recess in its inner face adjacent said flange, a flat polystyrene disc disposed within and hermetically sealed in said recess.

4. A brake lining pad having a frictional wearing surface and a back face and, incorporated and hermetically sealed therein spacedly from said surface and adjacent said back face, a heat sensitive odor producing compound.

5. A brake lining pad comprising a polystyrene button embedded and hermetically sealed therein spacedly from the surface of the pad which is subject to wear.

6. In a brake, a brake lining pad having a front surface subject to wear and a back face, said pad having a recess entering thereinto through its said back face and terminating spacedly from its said surface, a quantity of polystyrene material in said recess, and means at said back face hermetically closing said recess.

References Cited in the file of this patent

UNITED STATES PATENTS

| | | |
|---|---|---|
| 1,979,875 | Faus | Nov. 6, 1934 |
| 2,146,357 | Schweikle | Feb. 7, 1939 |
| 2,217,176 | Madison | Oct. 8, 1940 |
| 2,398,006 | Hunt | Apr. 9, 1946 |
| 2,461,164 | Lewis | Feb. 8, 1949 |
| 2,543,161 | Faus | Feb. 27, 1951 |
| 2,556,042 | Rogers | June 5, 1951 |
| 2,562,833 | True | July 31, 1951 |

FOREIGN PATENTS

| | | |
|---|---|---|
| 159,976 | Australia | Nov. 25, 1954 |